June 24, 1958  G. J. SHOMPHE  2,839,933
GYROSCOPE
Filed Nov. 20, 1953
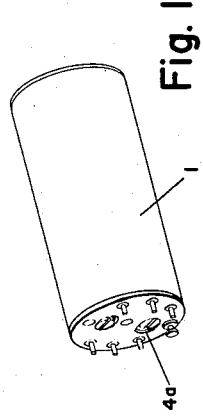
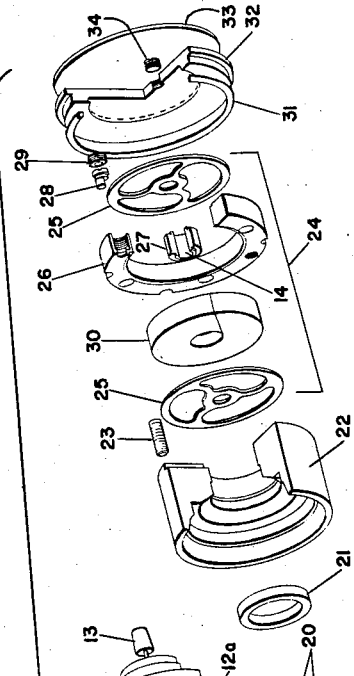
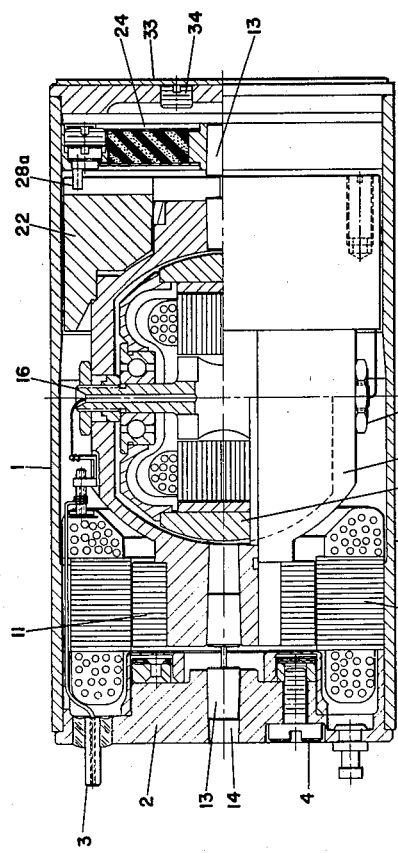
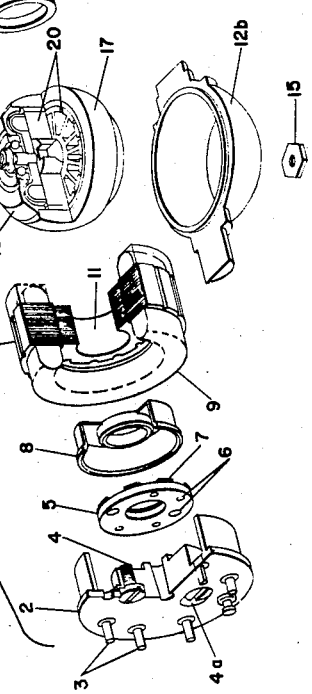
George J. Shomphe INVENTOR.
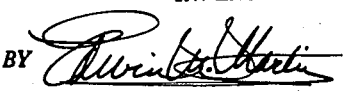

United States Patent Office 2,839,933
Patented June 24, 1958

2,839,933

GYROSCOPE

George J. Shomphe, Nashua, N. H., assignor, by mesne assignments, to Sanders Associates, Incorporated, Nashua, N. H., a corporation of Delaware Application November 20, 1953, Serial No. 393,284

5 Claims. (Cl. 74—5.5)

This invention relates generally to gyroscopes, and more particularly rate gyros, of the type employed in modern aircraft, guided missiles and the like. It is particularly directed to the provision of means for compensating for changes in volume within the gyro housing caused by temperature variations.

It is, therefore, an object of the present invention to provide an improved gyro with means for compensating for changes in the volume within the gyro housing.

Other and further objects will become apparent as the following description proceeds.

In the gyro hereinafter described all moving bearings are entirely eliminated from the gyro gimbal suspension. The support and the centering of the gimbal are accomplished by means of improved supporting elements which embody an invention described in a copending application. These torsion bars not only afford the required supporting means, but also a restraining torque which resists the motion of the gimbal about the output axis. Friction is essentially eliminated from the output shaft suspension.

In accordance with the present invention there is provided a member of cellular material containing gas which is compressible to compensate for relative changes in volume occasioned by the differences between the expansion of the fluid and parts within the housing and the housing itself with temperature changes.

An S-spring arrangement may be provided at one end of the gyro, which leaves the movable parts of the gyro assembly relatively free to move longitudinally while they are held rigid against transverse forces. This, among other advantages, prevents different rates of expansion of the gyro parts from placing special strain on the torsion bars. The cellular member of the present invention is preferably in the form of an annular disc which is disposed within the S-spring assembly.

By virtue of the various features of invention employed in the construction herein described there is achieved a subminiature gyro, less than one inch in diameter, less than two inches long and weighing only 2.9 ounces. This constitutes the smallest gyro now known to exist and meets or exceeds the performance characteristics of larger rate gyros, yet is capable of lower cost production than other larger available instruments.

For a more detailed description of the present invention, reference may now be made to the following description taken in connection with the accompanying drawing.

In the drawing, Fig. 1 is a perspective side view of a gyroscope embodying the present invention shown in actual size; Fig. 2 is an enlarged, side elevation view, partly in section, of the gyroscope of the present invention; and Fig. 3 is an exploded perspective view, partly in section, of the gyro shown in Figs. 1 and 2.

Referring now more particularly to the drawing, the gyro embodying the present invention is shown comprising a housing 1 of generally cylindrical form having attached at one end a cap 2 which may, for example, be mounted directly on an antenna platform.

Provided in the end cap 2 are leads 3 and null adjusting screws 4. The screws are inserted in their respective holes in the ring 5 through the elongated holes 4a in the end cap, which permit a limited amount of lateral movement of the screws. Null adjusting ring 5 is provided adjacent to the end cap 2 with the screws and rivet holes 6 and pick-off adjustment elements or laminations 7, as shown. A sealing ring 8 is provided at the opposite side of ring 5 with its outer edge surrounding the ring 5 and extending into the cap 2, followed by the pick-off windings 9 in which there is disposed a pick-off stator 10 and rotor comprising transformer laminations 11, as shown.

The gimbal 12 is disposed, in the central portion of the housing, as shown in Fig. 2, and comprises the split upper and lower sections 12a and 12b which are shown in detail in Fig. 3.

Torsion bars 13 are disposed at opposite ends of the gimbal. They each comprise a narrow central portion which provides the spring restraint and enlarged end portions which are formed integrally therewith and effect rigid and strong supports. The end portions of the bars are tapered and the supports on the gimbal, the end cap 2, and the hub or mount 27 of the S-spring assembly, presently to be described, are correspondingly tapered. They provide the rigid support while permitting rotative movement of the gimbal about the output axis, caused by the angular velocity of the rotor. The torsion bars also afford a restraining torque which resists the angular movement about the output axis of the gimbal and returns the gimbal and rotor to their normal relative angular positions immediately after the input force to the gyro has been removed. Friction is thus essentially eliminated from the output axis of the gyro.

The nuts 15 at the top and bottom of the gimbal sections secure the shaft 16 of the rotor 17. Suitable bearing retainers and bearings are disposed at each end of the rotor shaft providing a symmetrical, balanced, non-cantilever type of support. Caps 18 are provided for the rotor at each end thereof. The two sections of the gimbal are retained by ring 21 and pick-off rotor 11. An annular temperature compensator member 22 hereinafter further referred to in which several balance screws may be secured, one being shown in Fig. 3, is disposed at one end of the gimbal.

An arrangement is provided for preventing special strain on the operating parts of the gyro, particularly the torsion bars, which occur due to different rates of expansion of the parts within the gyro, with temperature changes. For this purpose an S-spring assembly 24 is disposed at one end of the housing. This assembly comprises a pair of S springs 25 disposed on opposite sides of a ring member 26, as shown. A hub element 27 which has the torsion bar tapered mounting 14, previously mentioned, and output axis stop pin 28 with lock 29 are provided, these parts being shown separately in Fig. 3 and assembled in Fig. 2. The pin 28 extends into a slot 28a in the annular member 22 which is fixed and rotates with the gimbal. The slot 28a is of a predetermined width and the pin 28 thus limits the amount of angular movement which is allowed the ring 22 and gimbal 12.

In accordance with the present invention there is provided an annular pressure compensator member 30. This member is of a cellular material such as foam rubber and its cells contain a gas or air which is compressible as hereinafter further explained.

An O ring or gasket 31, a housing-cap 32, and name plate 33 are secured, in the order named, at the S-spring end of the housing. The housing is filled with a suitable damping fluid, such as oil, through a plug 34 in housing cap 32.

The compensator ring member of the present invention, as stated, provides for compensation for volume changes within the housing of the gyro housing. The housing or case being filled with a suitable damping fluid or oil, temperature cycling occasions different rates of expansion between the fluid and the housing. The differences in expansion are compensated for by the compression of the gas within the annular member 30. This member 30, as stated above, being constructed of a cellular material, contains gas or air, which is compressible and compensates for the relative changes in volume occasioned by the differences between the expansion of the fluid and parts within the housing and the housing itself. Without such compensation, leakage or failure of the gyro would result.

The S-spring assembly permits the rotor and the torsion bar at this end of the housing to be relatively free for longitudinal movement, while remaining rigidly fixed for transverse forces. Among its other advantages, this arrangement, as above pointed out, compensates for special strains on the torsion bars and other parts of the gyro.

In order to maintain the stability of the gyro, as stated, the fluid in the housing provides a damping of the movement of the gimbal about the output axis. Also, the gimbal being immersed in the fluid is given a partially buoyant support which has the effect of reducing its sensitivity to linear acceleration and shock.

The damping member 22 is constructed of a suitable material, such as nylon, which expands with increasing temperature, reducing the gap between it and the housing. It thus increases the shearing damping action of the fluid so as to compensate for its reduction due to the lowering of viscosity of the fluid with temperature increases. A small viscosity variation of the damping fluid with temperature over a wide range and the above-mentioned compensation permits operation of the gyro with a minimum of damping variations down to extremely low temperatures, without requiring the use of external heaters to stabilize the damping fluid temperature. The damping fluid employed for the present gyro, which is commercially available as Dow Corning 200 Series Silicone, has this small viscosity variation with temperature characteristic.

The pick-off of the present gyro is basically a differential transformer, the mutual inductance between the primary and secondary of which is varied with variations in the relative angular position of the core laminations. This in turn is effected by the rotation of the output shaft or gimbal. Thus, this movement is translated into an electrical signal which is proportional and phase sensitive, that is directly responsive, to the gyro input angular velocity.

While there has been shown and described a particular embodiment of the present invention, it will be apparent to those skilled in the art that various changes and modifications may be made without departing from the spirit of the invention, and it is therefore intended in the appended claims to cover all such changes and modifications as fall fairly within the spirit and scope of this invention.

What is claimed is:

1. A gyroscope comprising a gimbal; a rotor supported within said gimbal with an axis of spin; a housing supporting said gimbal to permit its rotation about an axis perpendicular to said axis of spin; a fluid within said housing surrounding said gimbal for damping movement thereof; and a body within said housing having a plurality of minute cells each including a gas, said gas expanding or contracting to accommodate small amounts of said fluid in said cells as said housing changes in volume with temperature.

2. A gyroscope comprising a gimbal; a rotor supported within said gimbal with an axis of spin; a housing supporting said gimbal to permit its rotation about an axis perpendicular to the said axis of spin; a fluid within said housing surrounding said gimbal for damping movement thereof; an annular cellular rubber member at one end of said gimbal within said housing having a plurality of minute cells each including a gas, said gas expanding or contracting to accommodate small amounts of said liquid in said cells as said housing changes in volume with temperature.

3. A gyroscope comprising a gimbal; a rotor having an axis of spin and supported within said gimbal; a housing for said gimbal; means within said housing supporting said gimbal at its opposite ends and permitting its rotation about a second axis perpendicular to said axis of spin with limited longitudinal movement with respect to said second axis at one of said ends; and a body within said housing having a plurality of minute cells each including a gas, said gas expanding or contracting to accommodate small amounts of said fluid in said cells as said housing changes in volume with temperature.

4. A gyroscope comprising a gimbal; a rotor having an axis of spin and supported within said gimbal; a housing for said gimbal; means within said housing supporting said gimbal at its opposite ends and permitting its rotation about a second axis perpendicular to said axis of spin, with limited longitudinal movement with respect to said second axis at one of said ends and a body within said housing having a plurality of minute cells each including a gas, said gas expanding or contracting to accommodate small amounts of said fluid in said cells as said housing changes in volume with temperature.

5. A gyroscope comprising a gimbal; a rotor supported within said gimbal with an axis of spin; a housing for said gimbal; an S-spring assembly for extending spring tension with respect to gimbal supporting means; and gimbal supporting means within said housing, supporting said gimbal at its opposite ends permitting its rotation about a second axis perpendicular to said axis of spin with limited longitudinal movement against said spring tension with respect to said axis at one of said ends; and an annular cellular rubber member at one end of said gimbal within said housing compressible with changes in volume therein.

References Cited in the file of this patent

UNITED STATES PATENTS

| 1,743,533 | Davis | Jan. 14, 1930 |
| 2,246,738 | Lauck | June 24, 1941 |
| 2,260,396 | Otto | Oct. 28, 1941 |
| 2,261,945 | Abel | Nov. 11, 1941 |
| 2,515,274 | Stevenson | July 18, 1950 |
| 2,618,159 | Johnson | Nov. 18, 1952 |
| 2,656,726 | Braddon | Oct. 27, 1953 |
| 2,709,921 | Sylvan | June 7, 1955 |